(12) United States Patent
Sato

(10) Patent No.: US 8,097,316 B2
(45) Date of Patent: Jan. 17, 2012

(54) LAMINATED RESIN TUBE

(75) Inventor: Masatomi Sato, Koga (JP)

(73) Assignee: Sanoh Kogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 11/989,458

(22) PCT Filed: Jul. 26, 2006

(86) PCT No.: PCT/JP2006/314726
§ 371 (c)(1),
(2), (4) Date: Aug. 14, 2009

(87) PCT Pub. No.: WO2007/013486
PCT Pub. Date: Feb. 1, 2007

(65) Prior Publication Data
US 2009/0297749 A1 Dec. 3, 2009

(30) Foreign Application Priority Data
Jul. 26, 2005 (JP) .................................. 2005-215854

(51) Int. Cl.
*B32B 1/08* (2006.01)
(52) U.S. Cl. .................... 428/35.7; 428/36.9; 428/36.91; 428/36.6

(58) Field of Classification Search ............... 428/36.9, 428/474.4, 474.7, 35.7, 421, 422, 212, 36.91; 138/141
See application file for complete search history.

(56) References Cited

U.S. PATENT DOCUMENTS
2004/0126523 A1* 7/2004 Masuda et al. ............... 428/35.7

FOREIGN PATENT DOCUMENTS
| JP | 2004-203012 | 7/2004 |
| JP | 2004-245411 | 9/2004 |
| JP | 2005-119017 | 5/2005 |
| JP | 2005-178078 | 7/2005 |

OTHER PUBLICATIONS

Patent Abstracts of Japan of JP 2004-203012, dated Jul. 22, 2004.
Patents Abstracts of Japan of JP 2004-245411, dated Sep. 2, 2004.
Patents Abstracts of Japan of JP 2005-178078, dated Jul. 7, 2005.
Patents Abstracts of Japan of JP 2005-119017, dated May 12, 2005.

* cited by examiner

*Primary Examiner* — Rena Dye
*Assistant Examiner* — Ellen S Wood
(74) *Attorney, Agent, or Firm* — Ladas & Parry LLP

(57) ABSTRACT

A laminated resin tube is formed mainly of inexpensive materials and has improved low-permeable ability.
The laminated resin tube has a plurality of laminated component resin tubes made of thermoplastic resins. At least one of the plurality of component resin tubes is a first low-permeable barrier tube made of polyamide 9T, and the rest of the component resin tubes include a resin tube made of polyamide 6 or polyamide 66.

7 Claims, 1 Drawing Sheet

LAMINATED RESIN TUBE

TECHNICAL FIELD

The present invention relates to a laminated resin tube for use as a fuel line on an automobile. More particularly, the present invention relates to a laminate resin tub e made principally of an inexpensive polyamide resin and having improved impermeability to fuel.

BACKGROUND ART

Resin tubes have been prevalently applied to fuel lines of automobiles in recent years.

Resin tubes have many advantages; resin tubes are not rusted whereas metal tubes are rusted, are easily workable, provide a high degree of freedom of design and are lightweight.

It is a problem, when resin tubes are applied to fuel lines, that gasoline permeates resin tubes and dissipates. Regulations for regulating the permeation of fuel through resin tubes have become progressively severe.

It is an urgent problem to provide resin tubes intended for application to fuel lines additionally with a property that makes it difficult for fuel to permeate resin tubes. Such a property will be referred to as a "low-permeable property".

A resin tube for fuel lines is regarded as having a low-permeable property when the amount of hydrocarbons permeated the resin tube measured by a CARB DEL method using a SHED tester is 50 mg/m·day or below.

A known laminated resin tube has an innermost tube, which comes into contact with gasoline, made of a resin having a low-permeable property, and an outermost tube made of a polyamide resin and bonded to the innermost tube by an adhesive layer to improve low-permeable property.

The applicant of the present invention patent application proposed a laminated resin tube having an improved low-permeable property in Patent document 1. This previously proposed laminated resin tube has at least two low-permeable resin tubes, and one of the low-permeable resin tubes is made of one of thermoplastic resins including ethylene tetrafluoroethylene resins (ETFE resins), liquid-crystalline polymers (LCPs), polyphenylene sulfide resins (PPS resins), ethylene-vinyl alcohol resins (EVOH resins), and polybutylene naphthalate resins (PBN resins).

The fluorocarbon resins, namely, the ETFE resins, among those resins are very excellent in the low-permeable property. A known laminated resin tube has an outer tube made of polyamide 12 and an inner tube made of a fluorocarbon resin.

Patent document 1: Jpn. Pat. App. No. 2002-338173 (JP 2004-169851 A)

DISCLOSURE OF THE INVENTION

Problem to be Solved by the Invention

While on the one hand the fluorocarbon resin is useful for improving the low-permeable property of the resin tube, the fluorocarbon resin is expensive and increases the manufacturing cost of the resin tube.

Accordingly, it is an object of the present invention to solve problems in the related art and to provide a laminated resin tube made of materials including an inexpensive polyamide resin as a principal material and having an improved low-permeable property.

Another object of the present invention is to provide a laminated resin tube having conductivity and low-temperature impact resistance in addition to low-permeable property.

Means for Solving the Problem

The present invention provides a laminate resin tub e formed by laminating a plurality of component resin tubes each of a thermoplastic resin, wherein at least one of the component resin tubes is a first low-permeable barrier tube of polyamide 9T, and the rest of the component resin tubes include a resin tube of a material containing polyamide 6 or polyamide 66 as a principal component.

In the laminate resin tube according to the present invention, it is preferable that the resin tube contiguous with the outside surface of the first low-permeable barrier tube is the outermost impact-resistant resin tube made of a material prepared by fusing polyamide 11 or polyamide 12 containing an elastomer and not containing any elastomer as a base resin, and polyamide 11 or polyamide 12 containing an elastomer to enhance the dispersion of the elastomer.

Preferably, the resin tube contiguous with the inside surface of the resin tube contiguous with the inside surface of the first low-permeable barrier tube is a second low-permeable barrier tube of a material containing polyamide 6 and polyamide 66 as principal components.

Preferably, the resin tube contiguous with the inside surface of the first low-permeable barrier tube for enhancing adhesive strength of a bond between the first and the second low-permeable barrier tube is a spacing tube of polyamide 11 or polyamide 12 having bonding affinity with both an adhesive layer between the first and the second low-permeable barrier tube and the first low-permeable barrier tube of polyamide 9T.

The innermost resin tube contiguous with the inside surface of the second low-permeable resin tube may be a third low-permeable barrier tube to provide the laminate resin tube with three barrier tubes.

Preferably, the third low-permeable barrier tube is made of a conductive resin containing a polyamide resin and a conductive filler, such as carbon nanotubes, carbon black or carbon filaments.

The present invention can improve a low-permeable property by using a material containing inexpensive polyamide resins as principal components and not using any fluorocarbon resins, and can provide various properties in addition to a low-permeable property.

BEST MODE FOR CARRYING OUT THE INVENTION

Figure 1:
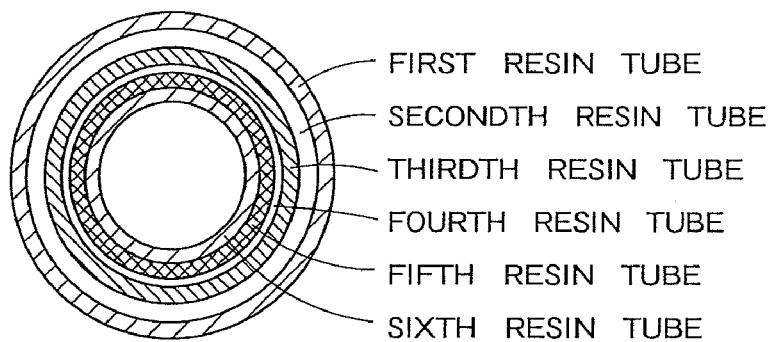
FIG. 1 is a cross-sectional view of a laminate resin tube in a preferred embodiment according to the present invention.

A laminated resin tube in a preferred embodiment according to the present invention will be described with reference to the single accompanying drawing.

FIG. 1 is a cross-sectional view of the laminated resin tube in the preferred embodiment. The laminated resin tube has six nested component resin tubes. Those six component resin tubes are a first resin tube, namely, the outermost resin tube, to a sixth resin tube, namely, the innermost resin tube. The first resin tube is capable of strengthening the laminated resin tube and of providing the laminate resin tube with high low-temperature impact strength. The second resin tube serves as a first low-permeable barrier tube capable of providing the laminated resin tube with low permeability to fuel. The fifth and the sixth resin tube are a second and a third low-permeable barrier tube, respectively. Thus the laminated resin tube in this embodiment has the three low-permeable barrier tubes. The third resin tube is a spacing tube for reinforcing adhesion between the second and the fifth resin tube. The fourth resin tube is an adhesive tube of an adhesive for holding original bond strength.

The first resin tube is made of PA11 or PA12. The second resin tube is made of PA9T having low permeability. The fifth resin tube is made of a nanocomposite containing a mixture of PA6 and PA66 having low permeability as a base material. the sixth resin tube is made of PA6 or PA66. The third resin tube is made of a resin, such as PA11 or PA12, having bonding affinity with both PA9T forming the second resin tube and the fourth resin tube, namely, the adhesive tube.

The low-permeable barrier tubes are made of PA9T having a solubility parameter (SP) of 11, namely, a very low-permeable resin. Therefore, the low permeability of the laminated resin tube can be enhanced even though the component resin tubes of the laminated resin tube are made of inexpensive polyamide resins. In this embodiment, the six component resin tubes including the three low-permeable barrier tubes of PA9T, PA6 and PA99 are nested to provide an inexpensive laminated resin tube having very low permeability without using expensive fluorocarbon resins.

The third resin tube, namely, the spacing tube, eliminates a problem related with the compatibility of the second resin tube of PA9T with the fourth resin tube of the adhesive. Therefore, adhesive strength of a bond between the second and the fifth resin tube can be enhanced without using any special adhesive tube.

When PA11 is used for forming the first resin tube, a mixed resin is prepared by mixing PA11 not containing any elastomer, namely, a base resin, and PA11 containing an elastomer to promote the dispersion of the elastomer. The first resin tube made of this mixed resin can provide the laminated resin tube with high low-temperature impact resistance. When PA12 is used, PA12 containing an elastomer is mixed in the base resin.

A conductive filler may be added to the sixth resin tube, namely, the innermost resin tube, to provide the sixth resin tube with conductivity in addition to the low permeability. A suitable conductive filler is carbon nanotubes, carbon black or carbon filaments. The conductive filler content of the resin for forming the sixth resin tube is in the range of 5 to 30 wt %. It is difficult to form the sixth resin tube so that the resistance thereof is not 105 Ω or below, which is a resistance to be met by fuel tubes, if the conductive filler content is 5% or below. The strength reduces excessively if the conductive filler content is not lower than 30 wt %.

The inside surface of the sixth resin tube is exposed to fuel. Therefore, an ETFE resin (ethylene tetrafluoroethylene resin may be used instead of PA6 or PA66 for forming the sixth resin tube.

The laminated resin tube in this embodiment is made principally of inexpensive polyamide resins and has various abilities in addition to low permeability.

Examples

Table 1 shows resins forming the component resin tubes of laminated resin tubes in Examples 1 to 10.

The laminated resin tubes in Examples 1 to 4 each having a first low-permeable barrier tube of PA11 are, for example, BESNEBK, P2OTL, BESNBK and TL (Arkema). The laminated resin tubes in Examples 5 to 8 each having a first low-permeable barrier tube of PA12 are, for example, 3030JI6L (Ube Kosan) and L25ANZ (EMS).

Suitable material as PA9T forming the second resin tube is N1001D (Kuerare).

The third resin tubes are made of PA11 and PA12 used for forming the first resin tubes.

The fourth resin tubes, namely, adhesive tubes, are made of an adhesive resin having amide or imide groups that form amide or imide bonds, a carboxylic acid or an acid-denatured resin. A preferable resin is, for example, 7034U (Ube Kosan).

The fifth resin tube, namely, the low-permeable barrier tube, is made of a nanocomposite prepared by mixing PA6 and PA66. A preferable resin is, for example, 5034UC2 (Ube Kosan).

The sixth resin tube, namely, the low-permeable barrier tube, is made of PA6. A preferable resin for forming the sixth resin tube is, for example, 1015JLX40 (Ube Kosan)

Laminated resin tubes in Examples 9 and 10 have each a sixth resin tube made of ETFE resin.

The invention claimed is:

1. A laminate resin tube formed by laminating a plurality of component resin tubes each of a thermoplastic resin, wherein at least one of the component resin tubes is a first low-permeable barrier tube of polyamide 9T, and the rest of the component resin tubes include a resin tube of a material containing polyamide 6 or polyamide 66 as a principal component,
    wherein the component resin tube contiguous with an outside surface of the first low-permeable barrier tube and the component resin tube contiguous with an inside surface of the first low-permeable barrier tube are made of a thermoplastic resin containing a polyamide resin as a principal component, and
    wherein the component resin tube contiguous with the outside surface of the first low-permeable barrier tube is an outermost impact-resistant resin tube made of a material prepared by fusing polyamide 11 or polyamide 12 not containing any elastomer as a base resin, and polyamide 11 or polyamide 12 containing an elastomer to enhance a dispersion of the elastomer.

2. The laminated resin tube according to claim 1, wherein the component resin tube contiguous with the inside surface of the component resin tube contiguous with the inside surface of the first low-permeable barrier tube is a second low-

TABLE 1

| Tube position | Example 1 | Example 2 | Example 3 | Example 4 | Example 5 | Example 6 | Example 7 | Example 8 | Example 9 | Example 10 |
|---|---|---|---|---|---|---|---|---|---|---|
| First resin tube | PA11 | PA11 | PA11 | PA11 | PA12 | PA12 | PA12 | PA12 | PA11 or PA12 | PA11 or PA12 |
| Second resin tube | PA9T | PA9T | PA9T | PA9T | PA9T | PA9T | PA9T | PA9T | PA9T | PA9T |
| Third resin tube | PA11 or PA12 | PA11 or PA12 | PA11 or PA12 | PA11 or PA12 | PA11 or PA12 | PA11 or PA12 | PA11 or PA12 | PA11 or PA12 | PA11 or PA12 | PA11 or PA12 |
| Forth resin tube | Adhesive layer | Adhesive layer | Adhesive layer | Adhesive layer | Adhesive layer | Adhesive layer | Adhesive layer | Adhesive layer | Adhesive layer | Adhesive layer |
| Fifth resin tube | PA6/66NCH | PA6/66NCH | PA6/66NCH | PA6/66NCH | PA6/66NCH | PA6/66NCH | PA6/66NCH | PA6/66NCH | PA6/66NCH | PA6/66NCH |
| Sixth resin tube | Electric non-conductive PA6 | Electric conductive PA6 | Electric non-conductive PA6 | Electric conductive PA6 | Electric non-conductive PA6 | Electric conductive PA6 | Electric non-conductive PA6 | Electric conductive PA6 | Electric non-conductive PA6 | Electric conductive PA6 | permeable barrier tube of a material containing polyamide 6 or polyamide 66 as principal components.

3. The laminated resin tube according to claim 2, wherein the component resin tube contiguous with the inside surface of the first low-permeable barrier tube is a spacing tube of polyamide 11 or polyamide 12 having bonding affinity with both an adhesive layer between the first and the second low-permeable barrier tube and the first low-permeable barrier tube of polyamide 9T.

4. The laminated resin tube according to claim 3, wherein the an innermost component resin tube contiguous with the inside surface of the second low-permeable barrier tube is a third low-permeable barrier tube.

5. The laminated resin tube according to claim 4, wherein the third low-permeable barrier tube is made of a conductive resin containing a polyamide resin and a conductive filler.

6. The laminated resin tube according to claim 4, wherein, the conductive resin is a polyamide 6 or polyamide 66 containing more than 5 wt. % and not larger than 30 wt. % carbon nanotubes, carbon black or carbon filaments as the conductive filler.

7. The laminated resin tube according to claim 1, wherein the innermost layer having an inside surface to be exposed to fuel is made of an ethylene tetrafluoroethylene resin.

* * * * *